United States Patent Office 3,411,884
Patented Nov. 19, 1968

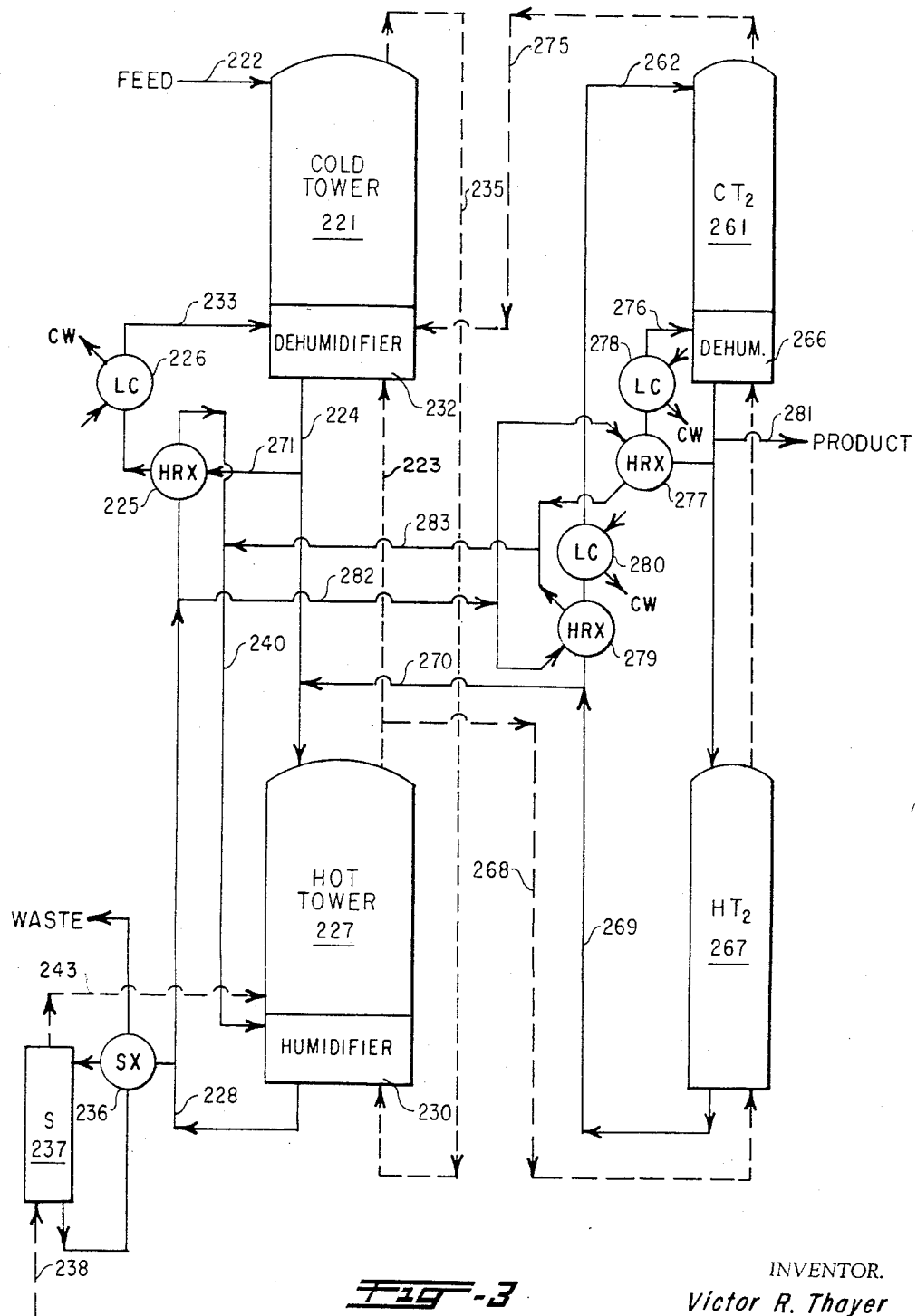

3,411,884
PROCESS FOR CONCENTRATING
HEAVY WATER
Victor R. Thayer, Newark, Del., assignor to the United States of America as represented by the United States Atomic Energy Commission
Filed Apr. 11, 1967, Ser. No. 630,486
2 Claims. (Cl. 23—204)

ABSTRACT OF THE DISCLOSURE

A process for concentrating deuterium oxide by isotope exchange between water and hydrogen sulfide in staged pairs of hot and cold isotope exchange towers. The water stream of the first stage is passed from feed through first stage cold and hot towers and disposed of. Water is recycled within the stages after the first. Recycle, countercurrent H₂S gas flow is established throughout all of the stages, a portion of the hydrogen sulfide flow of each stage except the last being cascaded to its subsequent stage. Water enriched in deuterium oxide is advanced from the first to higher stages by transport as humidity in the cascaded gas.

Background of the invention

The invention described herein was made in the course of, or under Contract AT(07-2)-1 with the U.S. Atomic Energy Commission.

Deuterium oxide, or as it is more commonly called, heavy water, finds substantial use as a moderator for nuclear reactors. It is commonly obtained by extraction from ordinary water by the dual temperature exchange process using hydrogen sulfide. The essentials of this process are fully described in U.S. Patent No. 2,787,526 patented April 2, 1957, in the name of J. S. Spevack, and its practice in two production facilities is described by Production of Heavy Water—Savannah River and Dana Plants—Technical Manual, W. P. Bebbington and V. R. Thayer, eds., J. F. Proctor, Comp., Du Pont Co., Aiken, S.C., A.E.C. R&D Report DP-400 (1959) and by "Production of Heavy Water," W. P. Bebbington and V. R. Thayer, Chemical Engineering Progress, vol. 55, No. 9, pp. 70–78 (September 1959).

In this process, liquid water flowing down through a pair of towers is contacted sequentially at two different temperatures by a countercurrent stream of H₂S gas. Briefly stated, the separation of hydrogen isotopes in this pair of towers is based upon the effect of temperature on the equilibrium constant for the isotope exchange reaction

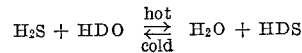

While water is a compound of hydrogen and oxygen represented by the formula H₂O, any body of naturally occurring water contains a significant quantity of hydrogen-oxygen compounds wherein one of the hydrogen atoms is the heavier isotope deuterium. This is expressed by the formula HDO. (At higher concentrations of deuterium, the isotopic form D₂O becomes significant.) In naturally occurring water about 1/7000 of the hydrogen atoms present are the deuterium isotope. Similarly, hydrogen sulfide while mostly H₂S, actually includes quantities of the isotopic form HDS.

When hydrogen sulfide and water are brought together in a liquid system, there is very rapid redistribution of the deuterium isotope adjusting the relative proportions of H₂O, HDO, H₂S and HDS as determined by the above equation. The equilibrium constant for this isotope exchange varies with temperature, lower temperatures favoring the HDO+H₂S side and higher temperatures the H₂O+HDS.

In the water-hydrogen sulfide dual temperature exchange process, water entering the system flows downward through the cold tower and hten through the hot tower countercurrent to the hydrogen sulfide gas stream. The water is progressively enriched in deuterium as it passes through the cold tower and progressively depleted in deuterium as it passes through the hot tower. Since the converse is true with respect to the hydrogen sulfide stream, the gas and liquid streams between the towers are enriched in the deuterium isotope. A portion of the enriched water is extracted from the water stream as product, the depleted water disposed of as waste, and the hydrogen sulfide stream continuously recycled as the separating agent.

The concentration of heavy water by this process, however, is difficult and expensive due to the extreme dilution of the deuterium atoms in ordinary water. Only about 20% of those present can be economically recovered. This means that in a typical process, for every pound of heavy water produced, a minimum of about 35,000 lb. of water must be fed and about 140,000 lb. H₂S gas must be circulated and cycled between hot and cold towers maintained at temperatures about 100° C. apart.

Many different flowsheets have been proposed to optimize the process with regard to capital cost and operating cost. Fully enriched product could be obtained in a single pair of towers if they contained a sufficient number of plates. However, it will be appreciated that this would require towers that are very large in both diameter and height and would require an excessive in-process inventory of heavy water. Accordingly, the process is staged to reduce the reflux ratio as the heavy water becomes enriched. Each stage comprises a pair of towers, one cold and one hot. Successive stages have towers of reduced diameter and handle reduced flows of liquid and gas.

Fully countercurrent flow of both water and hydrogen sulfide in the staged process has been used to minimize power consumption by reducing the total number of heat reversals required for both the gas and liquid streams. Fully countercurrent flow, as that term is used herein, refers to a flow arrangement wherein a portion of both streams of each stage is cascaded to and through its subsequent stage and returned. A portion of the water flow leaving the cold tower of each stage (except, of course, the last) is cascaded directly to the cold tower of the next stage where it flows through that cold tower, is raised to hot tower temperature, flows through the hot tower of that stage and is then returned without receiving further temperature adjustment to join the flow of the preceding stage at the top of the hot tower. Similarly, a portion of the hydrogen sulfide flow leaving the hot tower of each stage (except, of course, the last) is cascaded to the next stage where it flows through first the hot tower, is cooled to cold tower temperature, flows through the cold tower of that stage and is then returned to join the flow of the preceding stage at the bottom of the cold tower. Such fully countercurrent flow is described in Production of Heavy Water — Savannah River and Dana Plants — Technical Manual and "Production of Heavy Water," both referenced above. U.S. Patent 2,895,803 issued July 21, 1959, in the name of Jerome S. Spevack may also be of interest in this regard. In addition, the proposed optimized heat recovery arrangement for a countercurrent flow system described in "Economics of Heavy Water Production," J. F. Proctor and V. R. Thayer, Chemical Engineering Progress, vol. 58, No. 4, pp. 53–61 (April 1962) will be of interest.

None of the flowsheets according to the above references, however, is ideal under all circumstances. One limitation of all of them is that any contaminants in the feed water are circulated through all of the stages of the process, since a portion of the water stream of the first stage is cascaded directly to the second stage. Constituents in naturally occurring water available for use as feed water can cause corrosion, plugging or fouling of heat exchangers, and foaming, carryover, or flooding of the towers. Moreover, if sea water, brackish water, or ground water having a high mineral content is used as feed, it may be necessary to use expensive materials of construction to resist corrosion. Since it is in some circumstances impracticable to remove such constituents from the water to be used as feed (keeping in mind the large quantities required by the process), under such circumstances it would be very desirable to reduce their effect by restricting their distribution.

Moreover, processes according to previously proposed flowsheets either lose significant quantities of enriched product upon startup after process shutdown thereby extending the period of time required to reattain steady state conditions, or utilize a significant amount of special or auxiliary equipment to circumvent these problems. Although there are many exceptions depending upon specific process and tower parameters, generally speaking, when a process shutdown occurs, the process liquor in any particular tower drains to the bottom of that tower thereby destroying the concentration gradient which exists throughout that tower under normal operating conditions. In stages subsequent to the first, this liquor will be enriched, but at an average concentration for the particular tower. Upon re-establishment of fully countercurrent flow, the major portion of this average concentration liquor will be returned to preceding stages, (replaced by lower concentration liquor from preceding stages) and a significant portion eventually lost from the system before the concentration gradients can be re-established.

Summary of invention

Accordingly, it is an object of this invention to provide an improved process for concentrating deuterium oxide by isotope exchange between water and $H_2S$ wherein the distribution of contaminants introduced with the feed water is restricted. It is a further object of this invention to provide a water-hydrogen sulfide isotope exchange process which reduces the loss of enriched product upon startup after process shutdown and facilitates the reattainment of stead state operation.

Additionally, it is an object of this invention to accomplish such restriction of contaminants and reduction of loss of enriched product in a manner which has insignificant effect on the power consumption per unit of product produced.

As indicated above, heretofore in prior art processes water concentrated in deuterium was extracted from each stage from the water flow at the bottom of the cold tower and brought forward for further enrichment in the next stage, or in the case of the last stage extracted as the final enriched product. It has been found, however, that the humidity of the $H_2S$ steam leaving the hot tower is such that cascading a portion of that single stream to the subsequent stage provides not only the $H_2S$ but also a sufficient amout of water (in vapor state) for operating that subsequent stage. Since the deuterium content of this water vapor (humidity) is essentially identical to that of the top tray of the hot tower, it is equivalent in that respect to the water stream between the two towers, and, most importantly with respect to the first stage, does not carry forward any non-volatile contaminants introduced in the feed and incorporated in the first stage water stream. Accordingly, in the process according to the invention, the liquid water flow of the first stage is strictly limited to that stage, and isolated from the water flows of the subsequent stages. The carry forward, from at least the first stage, of water enriched in deuterium is accomplished solely through transport of water vapor in the humidified $H_2S$ cascade flow.

The isolation of the water flow of the first stage in accordance with the invention eliminates the transport of non-volatile contaminants contained in the feedwater. In addition, since the water in stages subsequent to the first is recycled within that particular stage during normal operation, the re-establishment of concentration gradients within the stages upon start-up after process shut down is readily accomplished with only minimal loss of enriched liquor from the system. Moreover, these advantages can be obtained with negligible effect on the costs per unit of product.

In summary, the above objects and attendent advantages are obtained in a process for concentrating deuterium oxide by isotope exchange between water and hydrogen sulfide in at least two stages of hot and cold isotope exchange tower pairs through which water and hydrogen sulfide are made to flow in countercurrent relationship. The liquid water flow in the first stage is established from a feed source through the first stage cold tower, first stage hot tower and to disposal. This first stage flow is completely isolated from the liquid water flow of subsequent stages. Recycle flow of liquid water completely separate from the first stage water flow is established in the stages subsequent to the first. In these subsequent stages, water is continuously cycled through and between the cold and hot towers thereof. A countercurrent, recycle flow of hydrogen sulfide is established throughout all of the stages, a portion of the flow of hydrogen sulfide leaving the hot tower of one stage enroute to the cold tower of that stage being diverted to its subsequent stage to flow through first the hot and then the cold towers of the subsequent stage and then return to the hydrogen sulfide flow stream of the preceding stage. Water enriched in deuterium is transported from the first stage to subsequent stages as water vapor is that part of the hydrogen sulfide flow of the first stage which is diverted to the second stage. Excess water from each stage subsequent to the first is returned to the water flow of a preceding stage. Product constituting water enriched in deuterium is withdrawn from the last stage.

The above and additional objects and advantages will appear and the summarized explanation of the invention understood from the following description of several embodiments thereof, the most novel features of which will be particularly pointed out hereinafter in connection with the appended claims.

Brief description of drawing

FIG. 1 is a schematic showing the flows of $H_2O$ and $H_2S$, in accordance with the invention and the heat reversals each is subjected to;

FIG. 3 is an alternative arrangement to that shown in FIG. 2.

Description of preferred embodiment

Figure 1:
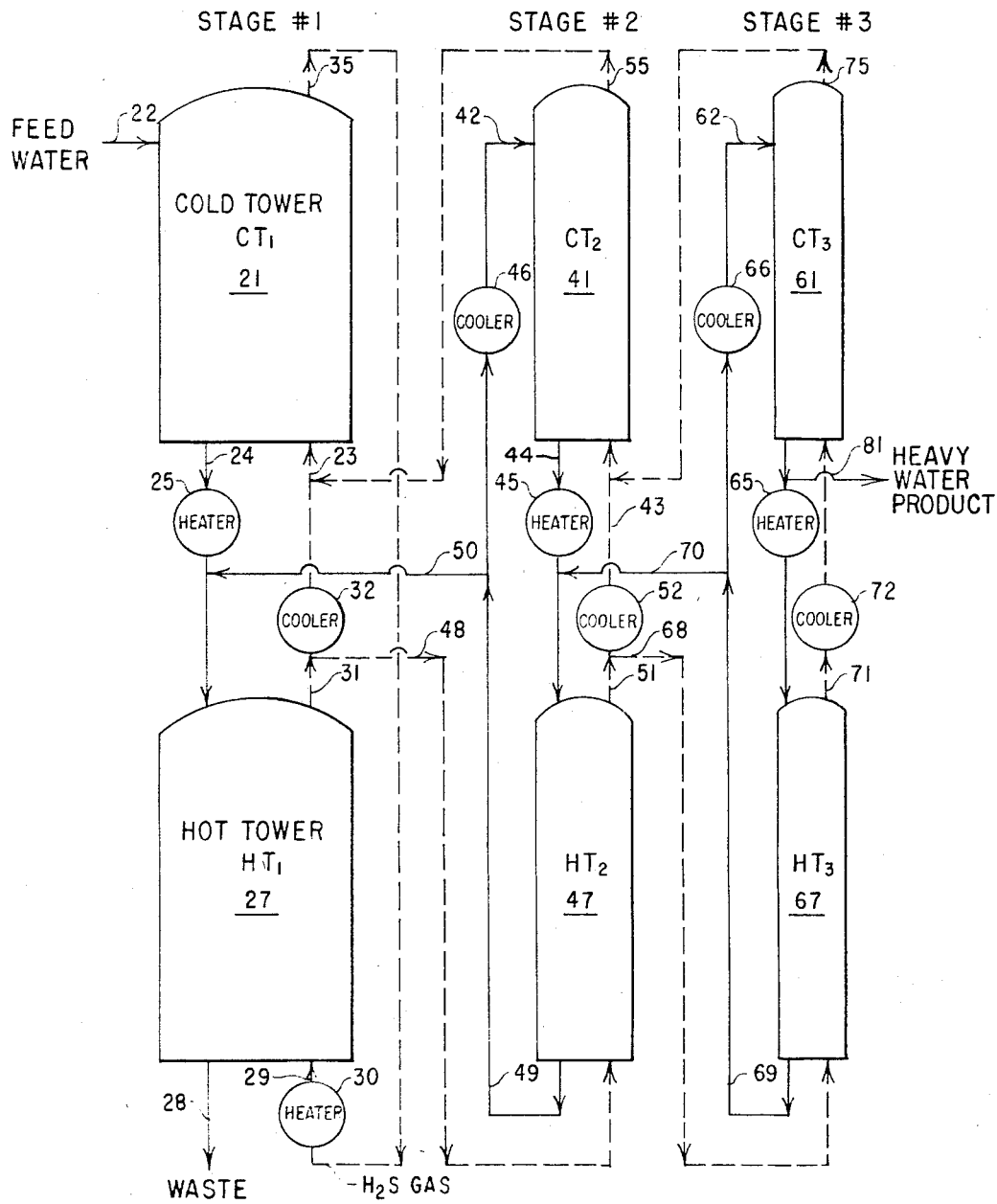

Referring to FIG. 1, the flow of the water and hydrogen sulfide in accordance with the invention is illustrated in diagrammatic manner. For ease in understanding the flow of these substances, the components of the heat recovery loops have been omitted and the various required heat-reversals indicated simply as heaters and coolers in the respective flow lines. Conventional items such as gas blowers, liquid pumps, valves, etc. have been omitted from the drawings since their use will be readily understood by those familiar with chemical engineering processes. While FIG. 1 shows the flows of water and $H_2S$ according to the invention, in a three stage arrangement, its applicability to other plural stage arrangements will be apparent. The liquid water flows are represented by solid lines and the $H_2S$ gas flow by conventional dotted lines throughout all of the drawings.

Feed water at a temperature of about 30° C. from a source not shown is introduced into first stage cold tower 21 through conduit 22 connected at the top thereof. As the water flows down through the tower it is progressively enriched in deuterium through isotope exchange with the $H_2S$ gas introduced at the bottom of cold tower 21 through conduit 23 and circulated upwardly therethrough. Contact between the countercurrent flows of water and $H_2S$ is facilitated by contact trays, or packing material, or other arrangement in the tower.

The enriched water leaves cold tower (CT) 21 through conduit 24, is raised in temperature to around 130° C. in heater 25 and enters the top of hot tower 27 where it is again brought into contact with the countercurrent flow of $H_2S$ flowing upwardly through the tower from its entry through inlet conduit 29. The water is progressively depleted in deuterium as it proceeds down the hot tower, to a deuterium concentration about 80% that contained in the feed. It is then carried away from tower 27 by conduit 28 to eventual disposal as waste.

The $H_2S$ gas entering first stage hot tower (HT) 27 through conduit 29 has been previously heated to hot tower temperature and humidity in heater-humidifier 30. The gas flow proceeds up the tower and exits through conduit 31. Since the concentration of deuterium in the water is essentially the same at the top of the hot tower and the bottom of the cold tower, the concentration of deuterium in the water vapor incorporated in the $H_2S$ stream leaving hot tower 27 is essentially at a maximum for the stage. A portion of that gas stream is cascaded to the second stage through conduit 48 and the remainder is cooled and dehumidified in cooler-humidifier 32 prior to entry into cold tower 21 through conduit 23. The stream flows upwardly through the cold tower exiting therefrom through conduit 35 by which it is returned to heater-humidifier 30 prior to entry into the bottom of hot tower 27 to complete the cycle.

The $H_2S$ diverted from the hot humidified stream leaving first stage hot tower 27 is conveyed to the bottom of hot tower 47 through conduit 48. This gas stream flows upwardly through tower 47 and leaves the top of the tower through conduit 51. A portion of the stream is diverted from conduit 51 to a third stage through conduit 68. The remainder is cooled in cooler-dehumidifier 52, enters cold tower 41 flowing upwardly therethrough, and is returned by conduit 55 to the first stage gas flow where it is combined with the flow in conduit 23 prior to entry into first stage cold tower 21.

The water in the second stage flows through what is essentially a continuous closed cycle. The second stage water enters the top of cold tower 41 through conduit 42, flows down through the tower and exists through conduit 44. The stream is then heated to hot tower temperature in heater 45 prior to entry into hot tower 47. The water exists tower 47 through conduit 49, and after being cooled in cooler 46 repeats the continuous cycle.

Since in all practical embodiments of the invention more water will be supplied to the second stage by way of the humidity brought forward with the hot gas cascaded from the top of the hot tower than will be taken forward to the third stage, a return line 50 is supplied to return excess water to the water stream of the first stage.

In view of the foregoing, the flows through the third stage will be readily understood since they are essentially identical to those of the second stage. The continuous closed cycle of water flows through cold tower 61, heater 65, hot tower 67, conduit 69, cooler 66 and back to cold tower 61 through conduit 62, As in the second stage, excess water is returned to the preceding stage by conduit 70. The portion of the gas (with enriched humidity) cascaded to the third stage from the second leaves second stage gas conduit 51 and flows through conduit 68, hot tower 67, conduit 71, cooler-dehumidifier 72, cold tower 61 and is then returned to second stage gas conduit 43 below second stage cold tower 41 by conduit 75.

The product will be extracted from the water flow between the two towers of the last stage as at 81. The product of the system will be water in which the concentration of $D_2O$ is many times the concentration in the feed water. This concentration of $D_2O$ in the product will, of course, vary with each particular process arrangement depending upon the total number of stages utilized and the parameters of each stage. Prior production facilities have utilized a plurality of stages of dual temperature $H_2O$–$H_2S$ exchange towers—the number of stages varying from two to five—to obtain an intermediate product having a concentration of $D_2O$ at about 15%. The final concentration of heavy water up to 99.8% was then obtained by fractional distillation or a combination of fractional distillation and electrolysis. However, final concentration can be obtained solely through the $H_2O$–$H_2S$ exchange process, economic consideration of cost factors for a particular site being determinative. The flowsheet of FIG. 1 can be readily adapted to arrangements other than that of three stages as depicted therein. A process of two stages would merely require alteration of FIG. 1 by removal of the second stage and connection of the first stage $H_2S$ lines (and the water return) directly to the final stage. Conversely, if a process of more than three stages is of interest, additional stages similar to the second stage shown in FIG. 1 would be inserted between the first and third stages.

As shown in FIG. 1, the first stage liquid water flow is completely isolated from the subsequent stages. The transport of enriched water from the first stage place entirely by way of the humidity in the $H_2S$ gas being cascaded to the second stage through gas line 48. Accordingly, it will be appreciated that non-volatile contaminants introduced into the first stage by the feed through conduit 22 will be restricted to the first stage. It will also be appreciated that since the water of the second stage and third stage is recycled within the stage, the enriched water which drains to the bottom of the towers upon process shutdown will be recycled within the stage upon start-up thereby facilitating the reattainment of normal concentration gradients and minimizing the loss of enriched liquor by transport back to a preceding stage.

Examination of FIG. 1 suggests that an apparent penalty is absorbed for isolating the first stage water and recycling the water of subsequent stages in accordance with the invention. This apparent penalty is represented by the additional heat reversals required to cool the water streams of the second and subsequent stages such as by coolers 46 and 66. Were portions of the water streams diverted from the bottom of the cold tower of each stage and passed to the top of the cold towers of the subsequent stages as is done in fully countercurrent flow systems, coolers 46 and 66 would, of course, be unnecessary. However, since the water stream in the second stage is typically only about one fourth that of the first stage, and since the cost involved in accomplishing the various heat reversals of the water streams are actually a small portion of the total in view of the fact that four times as much $H_2S$ gas as water by weight is circulated per unit of product produced involving a substantial flow of heat in humidification and dehumidification and the fact that heat reversals are much less difficult to accomplish in the liquid than in the gas streams, the apparent penalty is of small actual significance. Moreover, the major portion of the heat extracted from the water streams as represented in FIG. 1 by coolers 46 and 66 will be utilized in the heat recovery loop thereby making the actual increase in the power requirements of the process negligible. This will be apparent upon consideration of the two preferred embodiments depicted in FIGS. 2 and 3.

Figure 2:
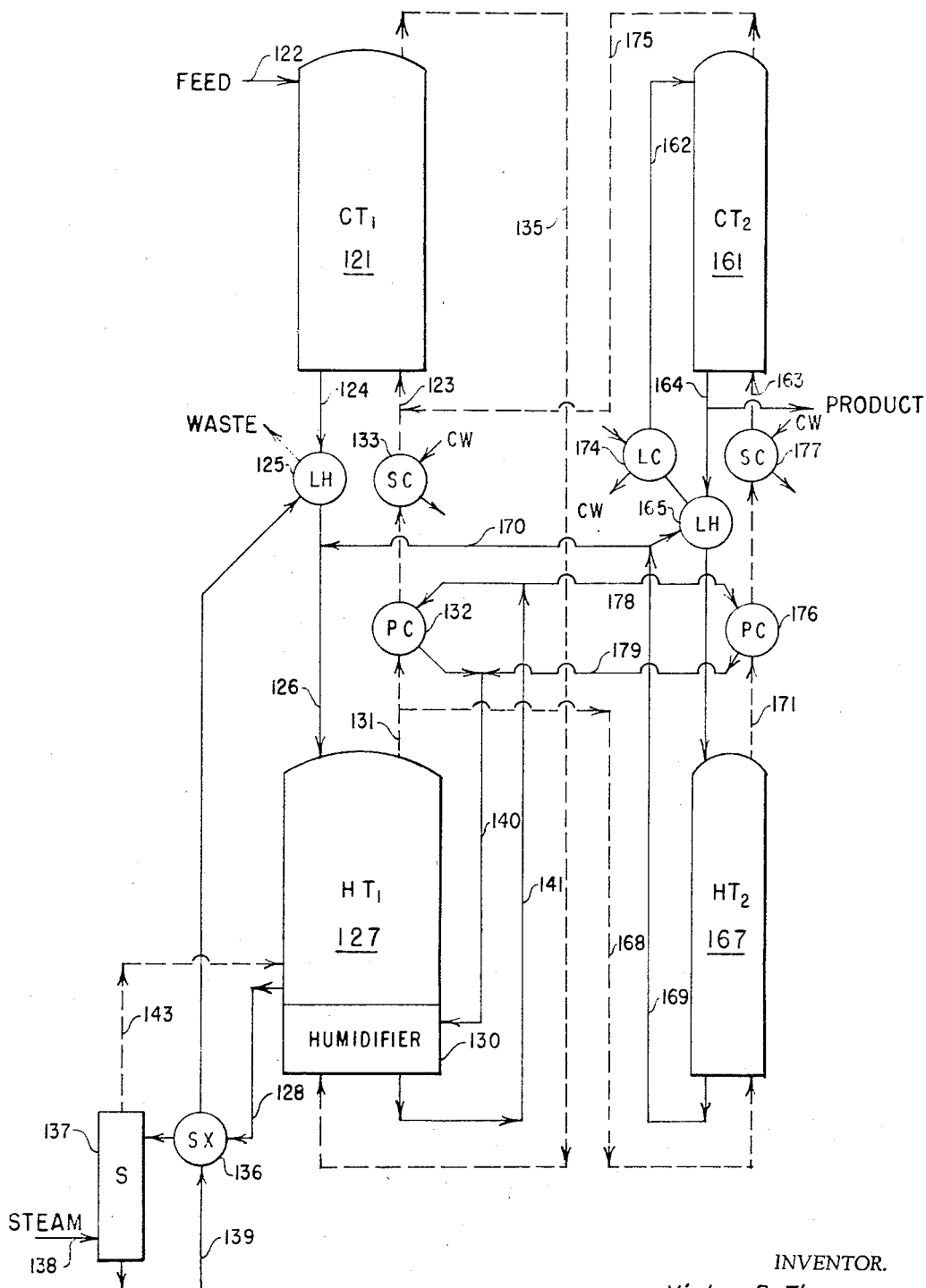
FIG. 2 is further schematic of the flowsheet according to FIG. 1 with a first embodiment of a heat recovery loop arrangement illustrated therein.

With reference now to the embodiment of FIG. 2, it will be noted that the flows of $H_2S$ and process water through the hot and cold towers of each stage and between the stages are identical to that depicted in FIG. 1. While FIG. 2 shows a two stage process, again, its applicability to a three or more stage process will be readily appreciated. The differences in the flow sheet of FIG. 2 to that of FIG. 1 (other than in the number of stages) lie entirely in the routing of the various streams in a manner whereby streams that are to be heated are brought into heat exchange relationship with streams requiring a removal of heat in order to reduce the total heat consumption of the process. First stage cold tower 121 receives feed water through conduit 122 at the top of the tower and $H_2S$ gas through conduit 123 at the bottom. The feed water exits cold tower 121 through conduit 124, is heated in liquid heat exchanger (LH) 125, enters the top of hot tower 127 through conduit 126, and exits the hot tower through conduit 128. $H_2S$ gas is introduced in the bottom of hot tower 127 through heater-humidifier 130 which constitutes an extension of the bottom of the hot tower. The heat content of the gas is increased in heater-humidifier 130, and the gas is then brought to hot temperature by admixture with steam entering the tower via conduit 143. The gas then flows through the tower, exits via conduit 131, is cooled first in primary condenser (PC) 132 and then secondary condensor (SC) 133, and then enters cold tower 121 through conduit 123. Conduit 135 returns the $H_2S$ to the bottom of hot tower 127 and heater-humidifier 130. The water condensate removed from the $H_2S$ stream by the primary and secondary condensers is joined to the water stream flowing between the towers by conduits not shown.

The fluid utilized to raise the temperature of the water stream in liquid heater 125 prior to entry into hot tower 127 is the first stage feed water which is being discarded as waste. The waste water leaves hot tower 127 by way of conduit 128, is preheated in stripper exchanger (SX) 136 and flows down through stripper tower (S) 137 countercurrent to high temperature steam introduced through conduit 138. The $H_2S$ dissolved in the waste water is removed by the high temperature steam and returned to the hot tower along with the steam via conduit 143 to about the same level of the hot tower from which waste water conduit 128 exits. The waste water which has been stripped of $H_2S$ and raised in tempertaure by the steam leaves stripper 137 through conduit 139 and is used as the heat exchange fluid in stripper exchanger 136 and liquid heater 125 before being discarded as waste.

As indicated above, heater humidifier 130 is actually a bottom extension of hot tower 127 and contains contacting trays or packing to facilitate heat exchange between the low temperature gas introduced through conduit 135 and the heat exchange water. The heat exchange water circulates between primary condenser 132 and heater humidifier 130, extracting heat from the hot $H_2S$ stream leaving the top of the hot tower via conduit 131 and giving up heat to the cold $H_2S$ stream introduced into heater-humidifier 130. The $H_2S$ stream leaving the top of the hot tower is further cooled by cooling water in secondary condenser 133 prior to entry into cold tower 121 via conduit 123.

Referring now to the second stage, which in the embodiment of FIG. 2 is also the final stage, cold tower 161 receives water at its top and $H_2S$ at its bottom through conduits 162 and 163 respectively. The water exits via conduit 164, and is heated in liquid heater 165 prior to entry into the top of hot tower 167. While the water is somewhat below hot tower temperature upon entry, it is quickly brought to temperature through contact with the flow of hot gas. The process water leaves the bottom of tower 167 through conduit 169, is routed through liquid heater 165 where it serves as the heat exchange fluid giving up heat to the cold water stream leaving cold tower 161 and is further cooled in liquid cooler (LC) 174 before re-entry into the top of cold tower 161. Conduit 170 is provided to carry the excess water back to the first stage as previously explained.

In a Savannah River unit as described in the above referenced manual, Production of Heavy Water—Savannah River and Dana Plants—Technical Manual, and the above referenced article, "Production of Heavy Water," converted to the embodiment of FIG. 2, this return flow through conduit 170 has proven to be about ⅓ that of the same unit prior to conversion, i.e., when water was cascaded forward to the second stage from the first stage water line between the cold and hot towers. No difference was detected in the operation of the unit with respect to amount or concentration of product produced.

As in the embodiment of FIG. 1, a portion of the hot, humidified $H_2S$ gas leaving first stage hot tower 127 via conduit 131 is passed to the bottom of second stage hot tower 167 through conduit 168. Leaving the top of tower 167 via conduit 171, the $H_2S$ stream is cooled in primary condenser 176. The heat exchange fluid utilized in condenser 176 is a portion of the water stream utilized in heater-humidifier 130 which is transported between primary condenser 176 and the heater-humidifier through conduits 178 and 179. Cooling water is utilized in secondary condenser 177.

The preferred arrangement of heat recovery for the $H_2O$–$H_2S$ exchange process according to the invention is the embodiment shown in FIG. 3. Again, the flows of $H_2S$ and process water through the hot and cold towers of each stage and between the stages are identical to that shown in FIGS. 1 and 2. The heat exchange arrangement differs from that shown in FIG. 2 in that dehumidification of $H_2S$ is accomplished by direct contact with a stream of water and the heat picked up by this water is then transferred by indirect exchange to the stream of water used to humidify $H_2S$. The advantage of this embodiment compared to the embodiment shown in FIG. 2 is that the exchange of heat is accomplished more economically. Furthermore it will be apparent from consideration of FIG. 3 that with this heat recovery arrangement there is no penalty, as regards heat transfer requirements, when feed water is isolated in the first stage. In fact the process water can be isolated or cascaded with no change in heat recovered or equipment used (except for an obvious switch in pipe connections). Thus the embodiment shown in FIG. 3 accomplishes the objects of this invention (restriction of contaminants introduced with the feed water, and reduction of product lost by process interruptions) with no penalty to heat consumption and indeed with an economic advantage in cost of the heat exchange equipment.

First stage cold tower 221 receives feed water through conduit 222 and $H_2S$ through conduit 223. $H_2S$ stream 223 comes directly from hot tower 227 and is at hot tower temperature. The bottom portion of cold tower 221 constitutes a dehumidifier 232 for cooling the $H_2S$ stream by direct contact with the water flowing through tower 221, supplemented by cooler water introduced into the top of the dehumidifier through conduit 233. The process water exits tower 221 at approximately the hot tower temperature through conduit 224, a portion being transported directly to hot tower 227 and the remainder diverted and cooled in heat recovery exchanger (HRX) 225 and water cooler 226, and returned to dehumidifier 232 via conduit 233.

Heat reversal of the gas and water streams is again accomplished at the bottom of the hot tower. The hot process water flowing through hot tower 227 and supplemental heating water supplied from heat recovery exchanger 225 via conduit 240 is again brought into direct heat exchange contact with the cold $H_2S$ stream in humidifier 230. The cold $H_2S$ stream comes directly from the top of cold tower 221 through conduit 235. The cold $H_2S$ stream is humidified and raised to hot tower temperature by the hot water in heater-humidifier 230 and the steam introduced into the hot tower through conduit 243. Conversely, the water leaving the heater-humidifier via conduit 228 is reduced in temperature. A portion of this water is routed to heat recovery exchanger 225 where it is increased in temperature by heat pickup from the dehumidifier recycle water and returned to the humidifier through conduit 240. The remainder of the water entering the humidifier is routed through preliminary heat exchanger 236, $H_2S$ stripper 237, and then to waste, after having first passed through preliminary exchanger 236 for heat removal. Steam is introduced to the stripper through conduit 238 from a suitable source not shown, and then routed to hot tower 227 through conduit 243.

In the second and final stage, second stage water enters cold tower 261 through conduit 262. Hot $H_2S$ flowing directly from hot tower 267 through conduit 263 enters the bottom of cold tower 261 through dehumidifier portion 266 wherein the hot $H_2S$ is cooled to cold tower temperature by direct contact with the cold water flowing down the tower as supplemented by colder water entering the dehumidifier through conduit 276. The water leaving dehumidifier 266 is approximately at hot tower temperature and a portion is passed directly to hot tower 267 by conduit 264 and a portion diverted for cooling in heat recovery exchanger 277 and water cooler 278 for reuse as coolant in dehumidifier 266 in a manner similar to the first stage.

The hot water leaving the bottom of hot tower 267 is recycled through heat recovery exchanger 279 and water cooler 280 to the top of cold tower 261. The heat recovery exchangers 277 and 279 are connected to the first stage heat recovery loop by conduits 282 and 283.

As in the previous embodiments, humidified $H_2S$ gas is carried forward from the first stage hot tower to the second stage hot tower by conduit 268 and returned from the second stage cold tower to the first stage cold tower by conduit 275. And as in the previous embodiment, excess water in the second stage is returned to the first stage water stream through conduit 270.

In summary then, the above description of the simplified flow sheet of FIG. 1 and the two embodiments of FIGS. 2 and 3 have shown and described an improved process for concentrating deuterium oxide by isotope exchange between water and hydrogen sulfide. It will be understood that various changes in the details herein described and illustrated in order to explain the nature of the invention may be made by those skilled in the art within the scope of the invention as expressed in the appended claims.

What is claimed is:

1. In a process for concentrating deuterium oxide by isotope exchange between water and hydrogen sulfide in at least two stages of hot and cold isotope exchange tower pairs through which water and hydrogen sulfide are made to flow in countercurrent relationship, the improvement comprising establishing a flow of first stage liquid water such that said water flows from a feed source through the first stage cold tower, first stage hot tower and to disposal thereof, said flow being maintained in isolation from the liquid water flow of subsequent stages, establishing recycle flow of liquid water separate from said first stage flow in stages subsequent to the first such that water flows in a continuous cycle through and between cold and hot towers thereof, establishing a recycle flow of hydrogen sulfide gas throughout all of the stages such that a portion of the flow of hydrogen sulfide leaving the hot tower of each stage except the last enroute to the cold tower of that stage is diverted to its subsequent stage to flow through first the hot and then the cold towers thereof and then returned to the hydrogen sulfide flow stream of the preceding stage, said portion of hydrogen sulfide flow leaving the hot tower transporting water vapor therewith as humidity, returning excess water from each subsequent stage to a preceding stage and withdrawing water enriched in deuterium as product from the last stage.

2. The process according to claim 1 wherein the number of stages is two and the continuous recycle flow of water in the second stage comprises flow through the cold tower of said stage, a heat reversal raising the temperature of the water, flow through the hot tower of said stage, a heat reversal lowering the temperature of the water and then return to the cold tower of said stage.

References Cited
UNITED STATES PATENTS 3,007,777  11/1961  Perret et al. _____ 23—204

OSCAR R. VERTIZ, *Primary Examiner.*

HOKE S. MILLER, *Assistant Examiner.*